United States Patent
Gupta et al.

(10) Patent No.: US 12,520,124 B2
(45) Date of Patent: Jan. 6, 2026

(54) APPARATUS, METHOD, AND COMPUTER PROGRAM

(71) Applicant: Nokia Technologies Oy, Espoo (FI)

(72) Inventors: Pallab Gupta, Bangalore (IN); Saurabh Khare, Bangalore (IN); Bruno Landais, Pleumeur-Bodou (FR); Georgios Gkellas, Petroupoli (GR); Alexander Milinski, Munich (DE); Attila Molnár, Göd (HU); Ulrich Wiehe, Bad Hersfeld (DE)

(73) Assignee: Nokia Technologies Oy, Espoo (FI)

( * ) Notice: Subject to any disclaimer, the term of this patent is extended or adjusted under 35 U.S.C. 154(b) by 482 days.

(21) Appl. No.: 17/665,906

(22) Filed: Feb. 7, 2022

(65) Prior Publication Data
US 2022/0264286 A1 Aug. 18, 2022

(30) Foreign Application Priority Data
Feb. 16, 2021 (IN) .............................. 202141006491

(51) Int. Cl.
*H04W 60/04* (2009.01)
*H04W 4/14* (2009.01)
*H04W 8/20* (2009.01)
*H04W 8/24* (2009.01)

(52) U.S. Cl.
CPC .............. *H04W 8/20* (2013.01); *H04W 4/14* (2013.01); *H04W 8/24* (2013.01); *H04W 60/04* (2013.01)

(58) Field of Classification Search
CPC ........... H04W 8/20; H04W 4/14; H04W 8/24; H04W 60/04
See application file for complete search history.

(56) References Cited

U.S. PATENT DOCUMENTS

| 2002/0196775 | A1* | 12/2002 | Tuohino | H04L 65/1095 370/352 |
| 2004/0242243 | A1* | 12/2004 | Luis | H04Q 3/005 455/461 |
| 2020/0305033 | A1* | 9/2020 | Keller | H04L 65/1016 |

(Continued)

OTHER PUBLICATIONS

"3rd Generation Partnership Project; Technical Specification Group Core Network and Terminals; Service-based support for SMS in 5GC; (Release 17)", 3GPP TR 29.829, V0.3.0, Feb. 2021, pp. 1-55.

(Continued)

*Primary Examiner* — Kevin T Bates
*Assistant Examiner* — Hector Reyes
(74) *Attorney, Agent, or Firm* — Barta Jones, PLLC

(57) ABSTRACT

Various aspects described herein relate to apparatus, methods, and computer programs for retrieving an identifier of a subscription network of a mobile subscriber in a communication system. For example, one such method includes registering with a network repository function network function as a mobile number portability network function providing a service allowing a consumer to retrieve an identifier of a subscription network of a mobile subscriber. This method also includes receiving a request from the consumer to retrieve the identifier of the subscription network of the mobile subscriber. This method further includes sending a response to the consumer comprising information to retrieve the identifier of the subscription network of the mobile subscriber.

18 Claims, 12 Drawing Sheets

---

800 Apparatus may discover via a NRF NF a MNP NF providing a service allowing a consumer to retrieve an identifier of a subscription network of a mobile subscriber

↓

802 Apparatus may send a request to the MNP NF to retrieve the identifier of the subscription network of the mobile subscriber

↓

804 Apparatus may receive a response from the MNP NF to retrieve the identifier of the subscription network of the mobile subscriber

(56) References Cited

U.S. PATENT DOCUMENTS

| | | | |
|---|---|---|---|
| 2021/0006535 A1* | 1/2021 | Kolanowski | H04W 12/35 |
| 2021/0204200 A1* | 7/2021 | Krishan | H04W 4/50 |
| 2021/0368306 A1* | 11/2021 | Garcia Azorero | H04L 12/1407 |
| 2021/0385734 A1* | 12/2021 | Keller | H04L 67/51 |
| 2022/0286464 A1* | 9/2022 | Zhao | H04L 63/0807 |
| 2023/0074288 A1* | 3/2023 | Filippou | H04L 47/127 |

OTHER PUBLICATIONS

"Solution to select the target PLMN based on GPSI when using SBI", 3GPP TSG-CT WG4 Meeting #101-bis-e, C4-210032, Agenda: 6.1.5, Ericsson, Jan. 25-29, 2021, 11 pages.

\* cited by examiner

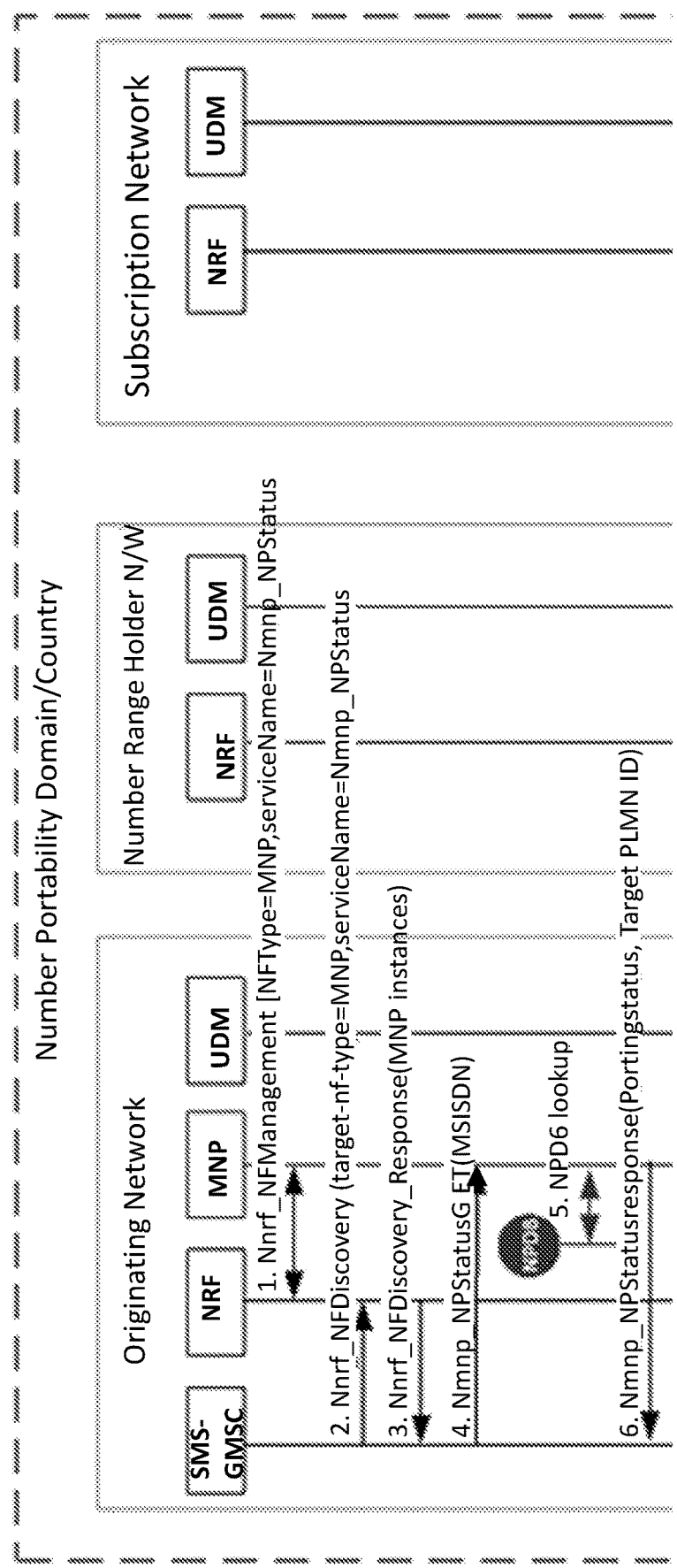

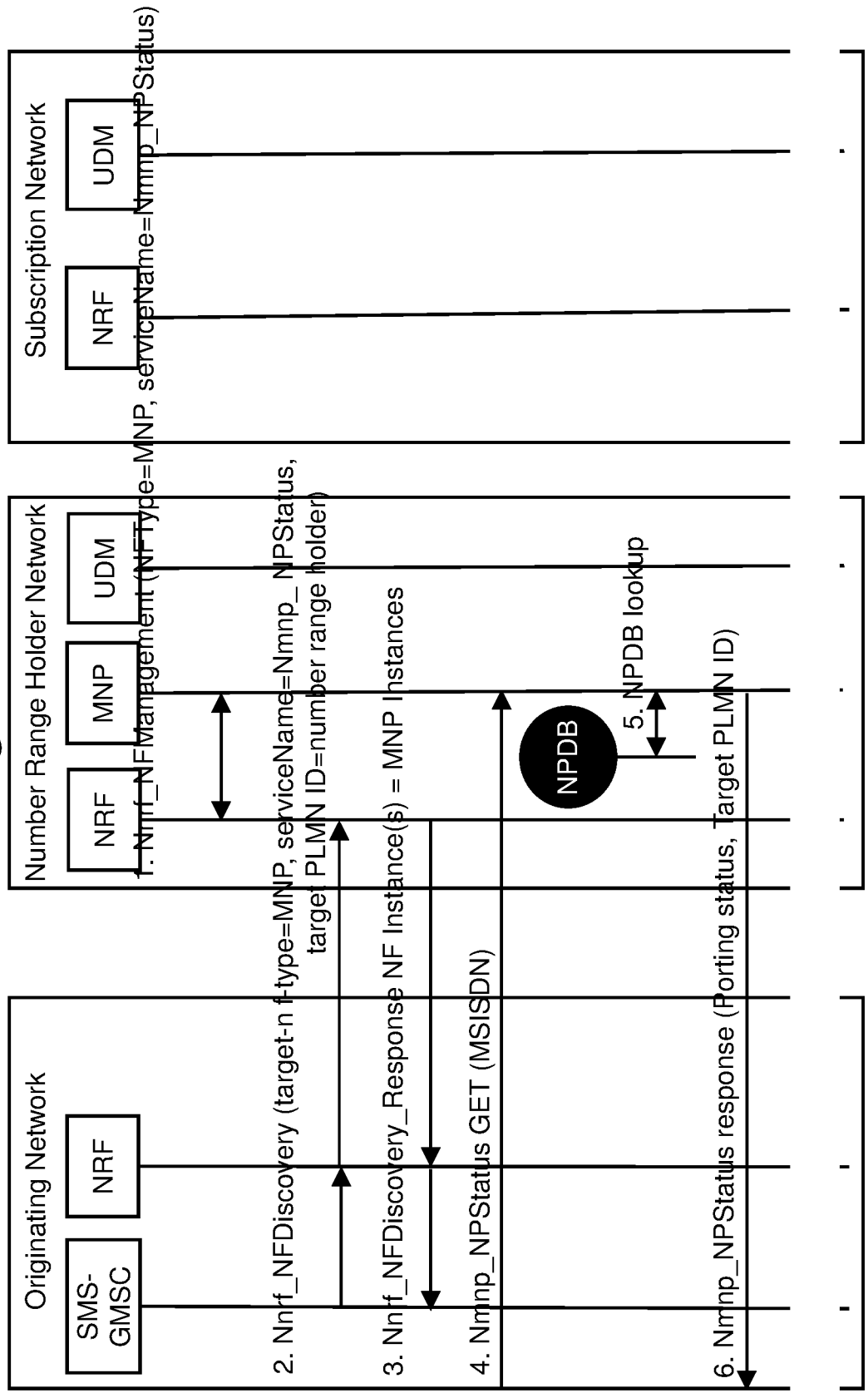

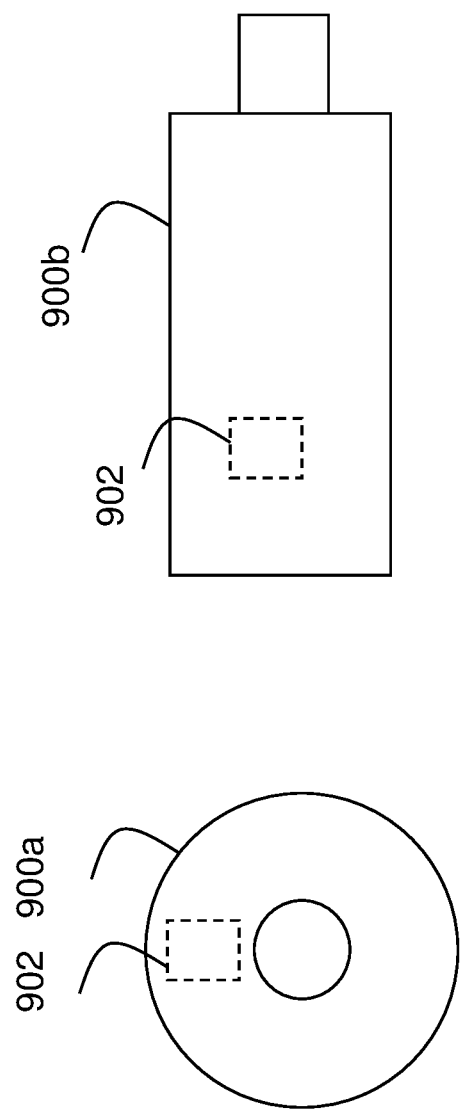

APPARATUS, METHOD, AND COMPUTER PROGRAM

CROSS-REFERENCE TO RELATED APPLICATIONS

This patent application claims priority to Indian Patent Application No. 202141006491, which was filed Feb. 16, 2021, and is incorporated herein by reference in its entirety.

FIELD

The present disclosure relates to an apparatus, a method, and a computer program for retrieving an identifier of a subscription network of a mobile subscriber in a communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising means for: registering with a network repository function network function as a mobile number portability network function providing a service allowing a consumer to retrieve an identifier of a subscription network of a mobile subscriber; receiving a request from the consumer to retrieve the identifier of the subscription network of the mobile subscriber; and sending a response to the consumer comprising information to retrieve the identifier of the subscription network of the mobile subscriber.

The response may comprise the identifier of the subscription network of the mobile subscriber; or the response may comprise information to derive the identifier of the subscription network of the mobile subscriber.

The identifier of a subscription network may comprise a public land identifier.

The information to derive the identifier of the subscription network of the mobile subscriber may comprise a routing number or a uniform resource identifier.

The mobile subscriber may be a short message service recipient.

The request may comprise an identifier of the mobile subscriber.

The identifier of the mobile subscriber may comprise a mobile subscriber integrated services digital network identifier.

The apparatus may comprise means for: determining a portability status of the identifier of the mobile subscriber.

The apparatus may comprise means for: determining that the identifier of the mobile subscriber is not ported; and wherein the identifier of the subscription network of the mobile subscriber comprises an identifier of a network the apparatus belongs to.

The apparatus may comprise means for: determining that the identifier of the mobile subscriber is ported; and the identifier of the subscription network of the mobile subscriber comprises an identifier of a network the apparatus does not belong to.

According to an aspect there is provided an apparatus comprising at least one processor and at least one memory including computer code for one or more programs, the at least one memory and the computer code configured, with the at least one processor, to cause the apparatus at least to: register with a network repository function network function as a mobile number portability network function providing a service allowing a consumer to retrieve an identifier of a subscription network of a mobile subscriber; receive a request from the consumer to retrieve the identifier of the subscription network of the mobile subscriber; and send a response to the consumer comprising information to retrieve the identifier of the subscription network of the mobile subscriber.

The response may comprise the identifier of the subscription network of the mobile subscriber; or the response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The mobile subscriber may be a short message service recipient.

The request may comprise an identifier of the mobile subscriber.

The identifier of the mobile subscriber may comprise a mobile subscriber integrated services digital network identifier.

The at least one memory and the computer code may be configured, with the at least one processor, to cause the apparatus at least to: determine a portability status of the identifier of the mobile subscriber.

The at least one memory and the computer code may be configured, with the at least one processor, to cause the apparatus at least to: determine that the identifier of the mobile subscriber is not ported; and wherein the identifier of the subscription network of the mobile subscriber comprises an identifier of a network the apparatus belongs to.

The at least one memory and the computer code may be configured, with the at least one processor, to cause the apparatus at least to: determine that the identifier of the mobile subscriber is ported; and the identifier of the subscription network of the mobile subscriber comprises an identifier of a network the apparatus does not belong to.

According to an aspect there is provided an apparatus comprising circuitry configured to: register with a network repository function network function as a mobile number portability network function providing a service allowing a consumer to retrieve an identifier of a subscription network of a mobile subscriber; receive a request from the consumer to retrieve the identifier of the subscription network of the mobile subscriber; and send a response to the consumer comprising information to retrieve the identifier of the subscription network of the mobile subscriber.

The response may comprise the identifier of the subscription network of the mobile subscriber; or the response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The mobile subscriber may be a short message service recipient.

The request may comprise an identifier of the mobile subscriber.

The identifier of the mobile subscriber may comprise a mobile subscriber integrated services digital network identifier.

The apparatus may comprise circuitry configured to: determine a portability status of the identifier of the mobile subscriber.

The apparatus may comprise circuitry configured to: determine that the identifier of the mobile subscriber is not ported; and wherein the identifier of the subscription network of the mobile subscriber comprises an identifier of a network the apparatus belongs to.

The apparatus may comprise circuitry configured to: determine that the identifier of the mobile subscriber is ported; and the identifier of the subscription network of the mobile subscriber comprises an identifier of a network the apparatus does not belong to.

According to an aspect there is provided a method comprising: registering with a network repository function network function as a mobile number portability network function providing a service allowing a consumer to retrieve an identifier of a subscription network of a mobile subscriber; receiving a request from the consumer to retrieve the identifier of the subscription network of the mobile subscriber; and sending a response to the consumer comprising information to retrieve the identifier of the subscription network of the mobile subscriber.

The response may comprise the identifier of the subscription network of the mobile subscriber; or the response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The mobile subscriber may be a short message service recipient.

The request may comprise an identifier of the mobile subscriber.

The identifier of the mobile subscriber may comprise a mobile subscriber integrated services digital network identifier.

The method may comprise: determining a portability status of the identifier of the mobile subscriber.

The method may comprise: determining that the identifier of the mobile subscriber is not ported; and wherein the identifier of the subscription network of the mobile subscriber comprises an identifier of a network the apparatus belongs to.

The method may comprise: determining that the identifier of the mobile subscriber is ported; and the identifier of the subscription network of the mobile subscriber comprises an identifier of a network the apparatus does not belong to.

According to an aspect there is provided a computer program comprising computer executable code which when run on at least one processor is configured to: register with a network repository function network function as a mobile number portability network function providing a service allowing a consumer to retrieve an identifier of a subscription network of a mobile subscriber; receive a request from the consumer to retrieve the identifier of the subscription network of the mobile subscriber; and send a response to the consumer comprising information to retrieve the identifier of the subscription network of the mobile subscriber.

The response may comprise the identifier of the subscription network of the mobile subscriber; or the response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The mobile subscriber may be a short message service recipient.

The request may comprise an identifier of the mobile subscriber.

The identifier of the mobile subscriber may comprise a mobile subscriber integrated services digital network identifier.

The computer program may comprise computer executable code which when run on at least one processor is configured to: determine a portability status of the identifier of the mobile subscriber.

The computer program may comprise computer executable code which when run on at least one processor is configured to: determine that the identifier of the mobile subscriber is not ported; and wherein the identifier of the subscription network of the mobile subscriber comprises an identifier of a network the apparatus belongs to.

The computer program may comprise computer executable code which when run on at least one processor is configured to: determine that the identifier of the mobile subscriber is ported; and the identifier of the subscription network of the mobile subscriber comprises an identifier of a network the apparatus does not belong to.

According to an aspect there is provided an apparatus comprising means for: discovering via a network repository function network function a mobile number portability network function providing a service allowing a consumer to retrieve an identifier of a subscription network of a mobile subscriber; sending a request to the mobile number portability network function to retrieve the identifier of the subscription network of the mobile subscriber; and receiving a response from the mobile number portability network function to retrieve the identifier of the subscription network of the mobile subscriber.

The response may comprise the identifier of the subscription network of the mobile subscriber.

The response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The request may comprise an identifier of the mobile subscriber.

The identifier of the mobile subscriber may comprise a mobile subscriber integrated services digital network identifier.

The identifier of the subscription network of the mobile subscriber may comprise an identifier of a network the apparatus belongs to.

The identifier of the subscription network of the mobile subscriber may comprise an identifier of a network the apparatus does not belong to.

The apparatus may be a short message service gateway mobile services switching center.

The apparatus may comprise means for: using an identifier of a network owning an identifier of the mobile subscriber to discover via a network repository function network function a unified data management network function; and sending a request to the unified data management network function to retrieve routing information for the mobile subscriber.

The apparatus may comprise means for: using the received identifier of the subscription network of the mobile subscriber to discover via a network repository function network function a unified data management network function.

The network repository function network function and the unified data management network function may belong to the same network than the apparatus; the network repository function network function and the unified data management network function may not belong to the same network than the apparatus and may belong to a network owning the identifier of the mobile subscriber; or the network repository function network function and the unified data management network function may not belong to the same network than the apparatus and may not belong to a network owning the identifier of the mobile subscriber.

The apparatus may comprise means for: sending a request to the unified data management network function to retrieve routing information for the mobile subscriber.

The apparatus may be a unified data management network function.

The apparatus may comprise means for: receiving a request from a short message service gateway mobile services switching center to retrieve routing information for the mobile subscriber; determining that subscriber data of the mobile subscriber is not stored in a unified data repository; and sending a response to the short message service gateway mobile services switching center without routing information for the mobile subscriber and with the identifier of the subscription network of the mobile subscriber.

According to an aspect there is provided an apparatus comprising at least one processor and at least one memory including computer code for one or more programs, the at least one memory and the computer code configured, with the at least one processor, to cause the apparatus at least to: discover via a network repository function network function a mobile number portability network function providing a service allowing a consumer to retrieve an identifier of a subscription network of a mobile subscriber; send a request to the mobile number portability network function to retrieve the identifier of the subscription network of the mobile subscriber; and receive a response from the mobile number portability network function to retrieve the identifier of the subscription network of the mobile subscriber.

The response may comprise the identifier of the subscription network of the mobile subscriber.

The response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The request may comprise an identifier of the mobile subscriber.

The identifier of the mobile subscriber may comprise a mobile subscriber integrated services digital network identifier.

The identifier of the subscription network of the mobile subscriber may comprise an identifier of a network the apparatus belongs to.

The identifier of the subscription network of the mobile subscriber may comprise an identifier of a network the apparatus does not belong to.

The apparatus may be a short message service gateway mobile services switching center.

The at least one memory and the computer code may be configured, with the at least one processor, to cause the apparatus at least to: use an identifier of a network owning an identifier of the mobile subscriber to discover via a network repository function network function a unified data management network function; and send a request to the unified data management network function to retrieve routing information for the mobile subscriber.

The at least one memory and the computer code may be configured, with the at least one processor, to cause the apparatus at least to: use the received identifier of the subscription network of the mobile subscriber to discover via a network repository function network function a unified data management network function.

The network repository function network function and the unified data management network function may belong to the same network than the apparatus; the network repository function network function and the unified data management network function may not belong to the same network than the apparatus and may belong to a network owning the identifier of the mobile subscriber; or the network repository function network function and the unified data management network function may not belong to the same network than the apparatus and may not belong to a network owning the identifier of the mobile subscriber.

The at least one memory and the computer code may be configured, with the at least one processor, to cause the apparatus at least to: send a request to the unified data management network function to retrieve routing information for the mobile subscriber.

The apparatus may be a unified data management network function.

The at least one memory and the computer code may be configured, with the at least one processor, to cause the apparatus at least to: receive a request from a short message service gateway mobile services switching center to retrieve routing information for the mobile subscriber; determine that subscriber data of the mobile subscriber is not stored in a unified data repository; and send a response to the short message service gateway mobile services switching center without routing information for the mobile subscriber and with the identifier of the subscription network of the mobile subscriber.

According to an aspect there is provided an apparatus comprising circuitry configured to: discover via a network repository function network function a mobile number portability network function providing a service allowing a consumer to retrieve an identifier of a subscription network of a mobile subscriber; send a request to the mobile number portability network function to retrieve the identifier of the subscription network of the mobile subscriber; and receive a response from the mobile number portability network function to retrieve the identifier of the subscription network of the mobile subscriber.

The response may comprise the identifier of the subscription network of the mobile subscriber.

The response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The request may comprise an identifier of the mobile subscriber.

The identifier of the mobile subscriber may comprise a mobile subscriber integrated services digital network identifier.

The identifier of the subscription network of the mobile subscriber may comprise an identifier of a network the apparatus belongs to.

The identifier of the subscription network of the mobile subscriber may comprise an identifier of a network the apparatus does not belong to.

The apparatus may be a short message service gateway mobile services switching center.

The apparatus may comprise circuitry configured to: use an identifier of a network owning an identifier of the mobile subscriber to discover via a network repository function network function a unified data management network function; and send a request to the unified data management network function to retrieve routing information for the mobile subscriber.

The apparatus may comprise circuitry configured to: use the received identifier of the subscription network of the mobile subscriber to discover via a network repository function network function a unified data management network function.

The network repository function network function and the unified data management network function may belong to the same network than the apparatus; the network repository function network function and the unified data management network function may not belong to the same network than the apparatus and may belong to a network owning the identifier of the mobile subscriber; or the network repository function network function and the unified data management network function may not belong to the same network than the apparatus and may not belong to a network owning the identifier of the mobile subscriber.

The apparatus may comprise circuitry configured to: send a request to the unified data management network function to retrieve routing information for the mobile subscriber.

The apparatus may be a unified data management network function.

The apparatus may comprise circuitry configured to: receive a request from a short message service gateway mobile services switching center to retrieve routing information for the mobile subscriber; determine that subscriber data of the mobile subscriber is not stored in a unified data repository; and send a response to the short message service gateway mobile services switching center without routing information for the mobile subscriber and with the identifier of the subscription network of the mobile subscriber.

According to an aspect there is provided a method comprising: discovering via a network repository function network function a mobile number portability network function providing a service allowing a consumer to retrieve an identifier of a subscription network of a mobile subscriber; sending a request to the mobile number portability network function to retrieve the identifier of the subscription network of the mobile subscriber; and receiving a response from the mobile number portability network function to retrieve the identifier of the subscription network of the mobile subscriber.

The response may comprise the identifier of the subscription network of the mobile subscriber.

The response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The request may comprise an identifier of the mobile subscriber.

The identifier of the mobile subscriber may comprise a mobile subscriber integrated services digital network identifier.

The identifier of the subscription network of the mobile subscriber may comprise an identifier of a network the apparatus belongs to.

The identifier of the subscription network of the mobile subscriber may comprise an identifier of a network the apparatus does not belong to.

The method may be performed by a short message service gateway mobile services switching center.

The method may comprise: using an identifier of a network owning an identifier of the mobile subscriber to discover via a network repository function network function a unified data management network function; and sending a request to the unified data management network function to retrieve routing information for the mobile subscriber.

The method may comprise: using the received identifier of the subscription network of the mobile subscriber to discover via a network repository function network function a unified data management network function.

The network repository function network function and the unified data management network function may belong to the same network than the apparatus; the network repository function network function and the unified data management network function may not belong to the same network than the apparatus and may belong to a network owning the identifier of the mobile subscriber; or the network repository function network function and the unified data management network function may not belong to the same network than the apparatus and may not belong to a network owning the identifier of the mobile subscriber.

The method may comprise: sending a request to the unified data management network function to retrieve routing information for the mobile subscriber.

The method may be performed by a unified data management network function.

The method may comprise: receiving a request from a short message service gateway mobile services switching center to retrieve routing information for the mobile subscriber; determining that subscriber data of the mobile subscriber is not stored in a unified data repository; and sending a response to the short message service gateway mobile services switching center without routing information for the mobile subscriber and with the identifier of the subscription network of the mobile subscriber.

According to an aspect there is provided a computer program comprising computer executable code which when run on at least one processor is configured to: discover via a network repository function network function a mobile number portability network function providing a service allowing a consumer to retrieve an identifier of a subscription network of a mobile subscriber; send a request to the mobile number portability network function to retrieve the identifier of the subscription network of the mobile subscriber; and receive a response from the mobile number portability network function to retrieve the identifier of the subscription network of the mobile subscriber.

The response may comprise the identifier of the subscription network of the mobile subscriber.

The response may comprise information to derive the identifier of the subscription network of the mobile subscriber.

The identifier of a subscription network may comprise a public land mobile network identifier.

The information to derive the identifier of the subscription network of the mobile subscriber may comprise a routing number or a uniform resource identifier.

The request may comprise an identifier of the mobile subscriber.

The identifier of the mobile subscriber may comprise a mobile subscriber integrated services digital network identifier.

The identifier of the subscription network of the mobile subscriber may comprise an identifier of a network the apparatus belongs to.

The identifier of the subscription network of the mobile subscriber may comprise an identifier of a network the apparatus does not belong to.

The at least one processor may be part of a short message service gateway mobile services switching center.

The computer program may comprise computer executable code which when run on at least one processor is configured to: use an identifier of a network owning an identifier of the mobile subscriber to discover via a network repository function network function a unified data management network function; and send a request to the unified data management network function to retrieve routing information for the mobile subscriber.

The computer program may comprise computer executable code which when run on at least one processor is configured to: use the received identifier of the subscription network of the mobile subscriber to discover via a network repository function network function a unified data management network function.

The network repository function network function and the unified data management network function may belong to the same network than the apparatus; the network repository function network function and the unified data management network function may not belong to the same network than the apparatus and may belong to a network owning the identifier of the mobile subscriber; or the network repository function network function and the unified data management network function may not belong to the same network than the apparatus and may not belong to a network owning the identifier of the mobile subscriber.

The computer program may comprise computer executable code which when run on at least one processor is configured to: send a request to the unified data management network function to retrieve routing information for the mobile subscriber.

The at least one processor may be part of a unified data management network function.

The computer program may comprise computer executable code which when run on at least one processor is configured to: receive a request from a short message service gateway mobile services switching center to retrieve routing information for the mobile subscriber; determine that subscriber data of the mobile subscriber is not stored in a unified data repository; and send a response to the short message service gateway mobile services switching center without routing information for the mobile subscriber and with the identifier of the subscription network of the mobile subscriber.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the claims.

List of abbreviations
    AF: Application Function
    AMF: Access and Mobility Management Function
    API: Application Protocol Interface
    BS: Base Station
    CU: Centralized Unit
    DB: Database
    DL: Downlink
    DU: Distributed Unit
    gNB: gNodeB
    NB: gNodeB
    GPSI: Generic Public Subscriber Identifier
    GSM: Global System for Mobile communication
    HSS: Home Subscriber Server
    ID: Identifier
    IoT: Internet of Things
    IP-SM-GW: Internet Protocol Short Message Gateway
    IWMSC: Interworking Mobile Switching Center LTE: Long Term Evolution
MAC: Medium Access Control
MNP : Mobile Number Portability
MS: Mobile Station
MSISDN : Mobile Subscribe Integrated Service Digital Network
MTC: Machine Type Communication
NEF: Network Exposure Function
NF: Network Function
NPDB: Number Portability Database
NPDI: Number Portability Dip Indicator
NR: New radio
NRF: Network Repository Function
PDU: Packet Data Unit
PLMN: Public Land Mobile Network
RAM: Random Access Memory
(R)AN: (Radio) Access Network
RN: Routing Number
ROM: Read Only Memory
SBA: Service Based Architecture
SBI: Service Based Interface
SEPP: Security Edge Protection Proxy
SMF: Session Management Function
SMSoNAS: Short Message Service over Non-Access Stratum
SMSF: Short Message Service Function
SMS-GMSC: Short Message Service Gateway Mobile Switching Center
TR: Technical Report
TS: Technical Specification
UDM: Unified Data Management
UDR: Unified Data Repository
UE: User Equipment
UMTS: Universal Mobile Telecommunication System
URI: Uniform Resource Indicator
3GPP: 3$^{rd}$ Generation Partnership Project
5G: 5$^{th}$ Generation
5GC: 5G Core network
5GS: 5G System

BRIEF DESCRIPTION OF THE FIGURES

Embodiments will now be described, by way of example only, with reference to the accompanying Figures in which:
FIG. 9 shows a schematic representation of a non-volatile memory medium storing instructions which when executed by a processor allow a processor to perform one or more of the steps of the methods of FIGS. 7 and 8.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
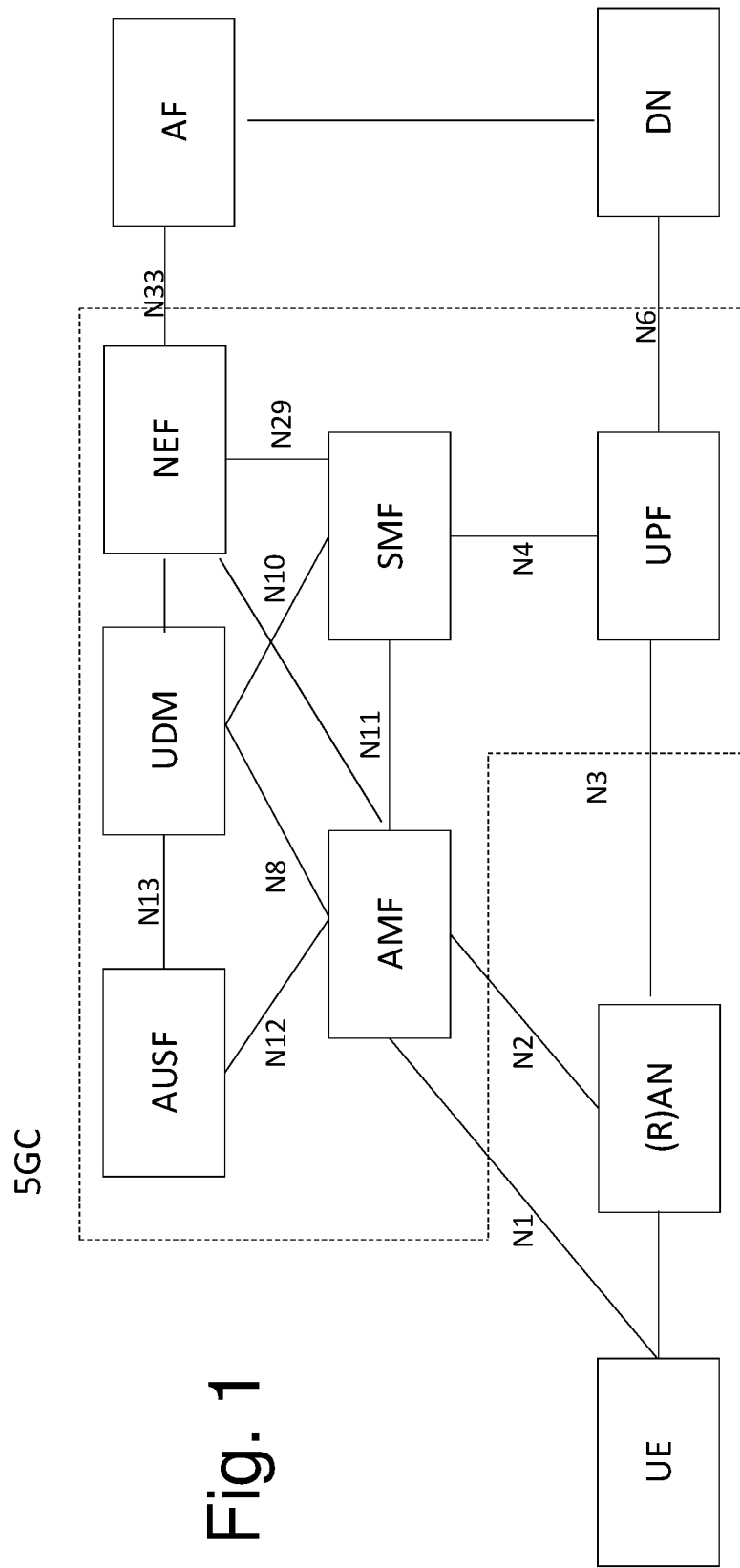
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a unified data management (UDM), a user plane function (UPF) and/or a network exposure function (NEF). Although not illustrated the 5GC may comprise other network functions (NF), such as a network repository function (NRF) or mobile number portability (MNP) and/or SMS entities, such as a short message service gateway mobile switching center (SMS-GMSC) or a short message service function (SMSF)

Figure 2:
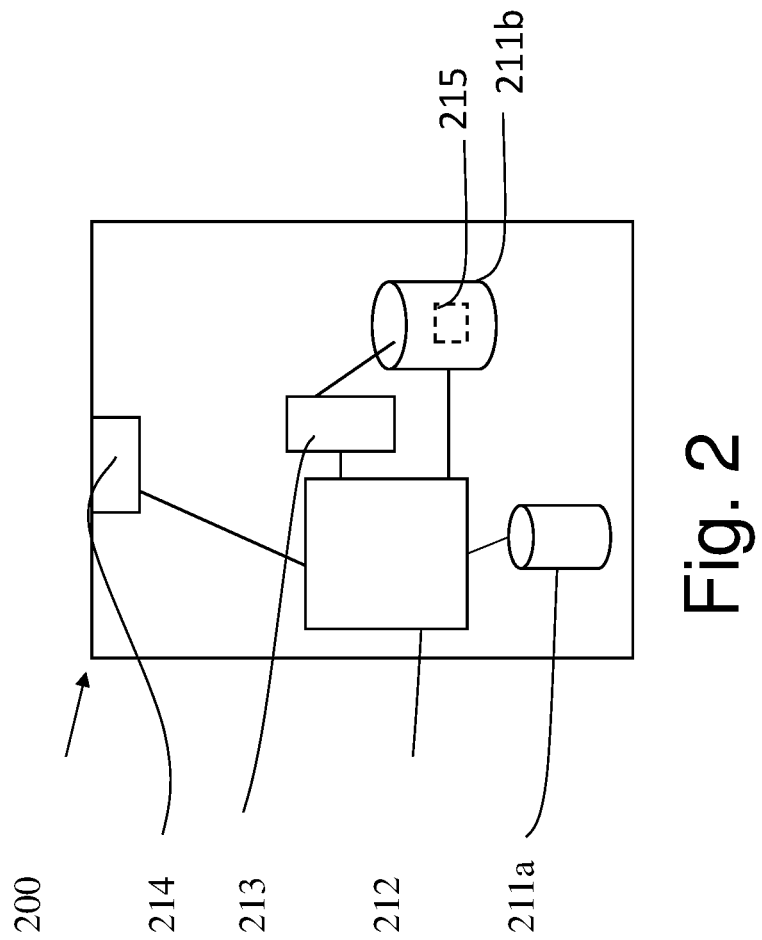
FIG. 2 shows a schematic representation of a control apparatus.

FIG. 2 illustrates an example of a control apparatus 200 for controlling a function of the (R)AN or the 5GC as illustrated in FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
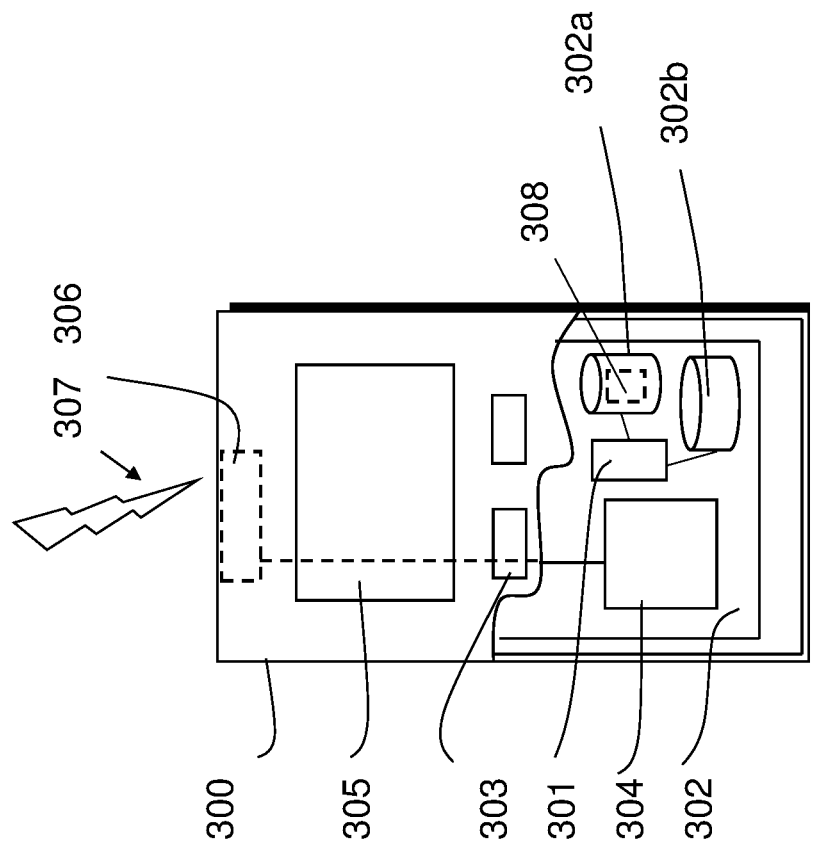
FIG. 3 shows a schematic representation of a terminal.

FIG. 3 illustrates an example of a terminal 300, such as the terminal illustrated in FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

In the 3GPP Rel-16 architecture for 5G short message service over non-access stratum (SMSoNAS), a SMSF and UDM may not expose service-based interfaces (SBI) to a IP-SM-GW, a SMS Router or a SMS Center. As a result, SMSoNAS transport to and from the SMSF and UDM (e.g. via IP-SM-GW, SMS Router, SMS Center or other NF) enabling to send mobile originating (MO) and mobile terminating (MT) SMS may be carried out via legacy MAP or Diameter protocols. This may generate the following issues.

No SBI-based interface may be defined for enabling the retrieval of routing information from the UDM for the transfer of short messages via IP-SM-GW, SMS Router, SMS Center or other NF.

No SBI-based interface may be defined for MO and MT SMS from and to -SM-GW, SMS Router, SMS Center or other NF that may want to send and receive SMS via interactions with SMSF.

MAP and/or Diameter may have to be supported by the SMSF and the UDM in order to fully support 5G SMSoNAS. It is hence not possible to deploy a pure SBI-based 5GC if SMS has to be supported.

In roaming scenarios, MO and MT SMS may not benefit from a new inter-public land mobile network (PLMN)5GC security framework based on the security edge protection proxy (SEPP) and the use of the secured N32 interface. MO and MT SMS may rely instead on legacy MAP or Diameter SMS interfaces with their well-known security vulnerabilities.

3GPP CT4 has been studying for 3GPP Rel-17 how to support SMS services in a 5GS using only SBIs (see 3GPP TR 29.829). As part of the study, Key Issue #3 studies 'Mechanism to select the target PLMN based on GPSI when using SBI'.

SMS may require routing of some signalling messages based on a public subscriber identifier (e.g. mobile subscriber integrated services digital network (MSISDN) identifier (ID)) of a SMS recipient. This may be the case of an interaction between the SMS-GMSC and the UDM to retrieve the routing information (e.g. a SMSF address) for the transfer of the short message to the SMSF serving the SMS recipient. The only known ID of the SMS recipient to the SMS-GMSC may be the MSISDN ID. The SMS-GMSC may needs to identify the target PLMN (i.e. the PLMN where the subscription data of the SMS recipient belongs) based on the MSISDN ID to route the signalling message to the UDM.

If MSISDN ID/number portability is not implemented the MSISDN ID prefix can be used to identify the target network. If MSISDN ID/number portability is implemented the MSISDN ID or the subscription data of the SMS recipient may be ported to another PLMN that is not the owner of the MSISDN ID/number range. In case that the SMS recipient belongs to a PLMN different from the PLMN of the SMS sender, the signaling may take place across PLMN borders.

The interactions requiring routing based on MSISDN ID may currently be accomplished using one of the existing protocols MAP or Diameter. These protocols may both use MSISDN ID as address. When SBIs are defined between SMS entities (e.g. SMS-GMSC, SMS Router, IP-SM-GW) and the 5GC (e.g. UDM, SMSF) a mechanism may be needed to determine the target PLMN for SBI operations between the SMS entities and the 5GC requiring routing based on the GPSI (e.g. MSISDN ID) of the SMS recipient, equivalent to existing mechanisms used in MAP or Diameter.

Current service discovery mechanisms in service based architecture (SBA) based on GPSI, specially discovery across PLMNs, may not include enough information to select the target PLMN. Additionally, while considering mobile number portability (MNP) aspects, signalling/routing becomes more complicated.

As of now only NRF based solution has been studied in the TR 29.829. But NRF based solutions may impact the NRF. It may not just be about performance NRF in 5GC may act as authorization server for SBI interactions and profile repository for producers' discovery. NRF may not support legacy protocols (e.g. ENUM). Moreover, NRF may not be designed with application logic for performing per user equipment level processing. No other solution is studied/published to solve this problem via SBI.

C4-210032 "Solution to select target PLMN based on GPSI when using SBI" is a proposal having an impact on NRF. Moreover, it uses a legacy protocol (e.g. ENUM) rather than following the service-based paradigm.

One or more aspects of the disclosure provide a solution (option 1) where the SMS-GMSC may perform an MNP query via a MNP NF defined in the 5GS architecture. Then, the SMS-GMSC may select the target PLMN and UDM.

One or more aspects of the disclosure provide another solution (option 2) where the SMS-GMSC may contact the UDM and the UDM may perform the MNP query via a MNP NF defined in the 5GS architecture. Then, the UDM may return an error response back to the SMS-GMSC with the target PLMN ID identifying the PLMN where the subscription data of the SMS recipients belongs to. The SMS-GMSC uses the target PLMN ID to re-query the appropriate UDM.

In the disclosure the MSISDN ID or number range holder network or PLMN may refer to the network or PLMN that owns the MSISDN ID/number range. The MSISDN ID may comprise a country code and a national destination code.

In the disclosure the subscription network or PLMN may refer to the network or PLMN that stores the subscription data for the SMS recipient identified by the MSISDN ID. When MSISDN ID/number portability is implemented a SMS recipient can move his/her subscription data from one PLMN to another PLMN in a same portability domain, without changing his/her MSISDN ID. In this case the MSISDN ID/number range holder network may not store the subscription data for the SMS recipient identified by the MSISDN ID.

Figure 4:
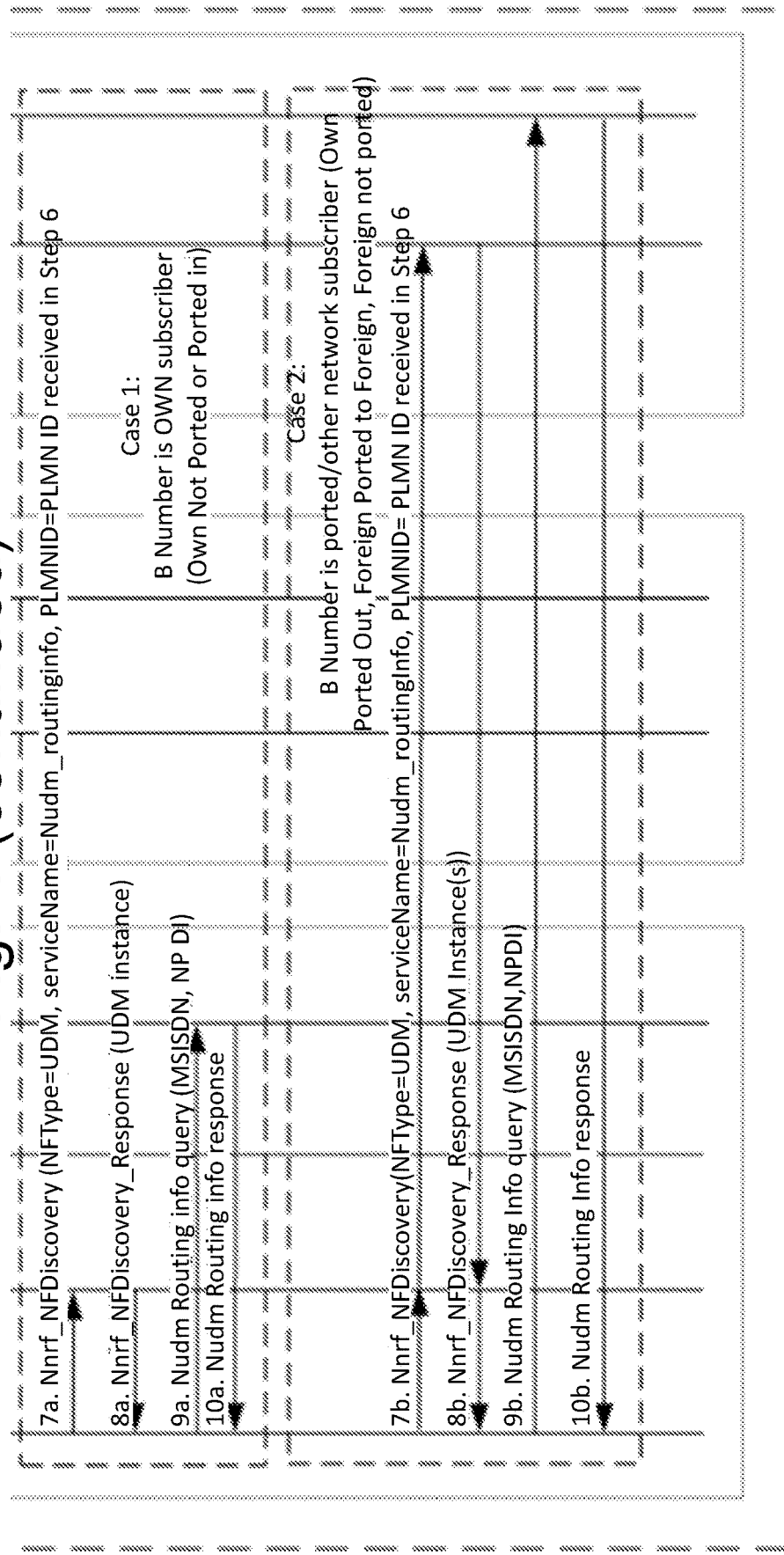
FIG. 4 shows a signaling diagram of a process for retrieving an identifier of a subscription network of a short message service recipient in a communication system according to a first option (direct routing scenario)

FIG. 4 shows a signalling diagram of a process for retrieving an identifier of a subscription network of a SMS recipient in a communication system according to a first option (direct routing scenario). In the first option, a SMS-GMSC may discover and query a MNP NE A MNP NF may be introduced in the 5GS architecture. The MNP NF may expose a service (API) that allows a consumer of the service to retrieve the PLMN ID of the subscription network of a MSISDN ID. The MNP NF interfaces with a MNP database (DB) to determine this information.

The MNP NF may register with the NRF of the originating PLMN (i.e. subscription PLMN of a SMS sender). The MNP NF may be discovered by a consumer of the originating PLMN. A NFType value "MNP" may be introduced for this purpose.

The MNP NF of the originating PLMN may provide a service (e.g. called 'Nmnp_NPStatus') used by a consumer of the originating PLMN to query the PLMN ID of the subscription PLMN of a subscriber based on his/her MSISDN ID. Other formats identifying the target PLM like a uniform resource identifier (URI) or a routing number (RN) may also be possible.

A SMS-GMSC of the originating PLMN may support SMS via SBI. The SMS-GMSC of the originating PLMN may discover an MNP NF via the NRF. To discover the MNP NF of the originating PLMN, the SMS-GSMC of the originating PLMN may send an NF discovery request with the query parameters target-nf-type set to "MNP".

If the NRF returns NF profiles of MNP NF in the discovery response, then the SMS-GMSC of the originating PLMN may contact the MNP NF of the originating PLMN via 'Nmnp_NPStatus' service of the MNP NF.

The SMS-GMSC of the originating PLMN may receive the PLMN ID of the subscription PLMN of the SMS recipient as a target PLMN ID from the MNP NF of the originating PLMN.

In one case, the subscription PLMN of a SMS recipient is the originating PLMN. The SMS-GMSC of the originating PLMN may receive the PLMN ID of the subscription PLMN of the SMS recipient, that is the PLMN ID of the originating PLMN, as a target PLMN ID.

Based on the target PLMN ID, the SMS-GMSC of the originating PLMN may query the NRF of the originating PLMN to discover a UDM of the originating PLMN. In the response, the NRF of the originating PLMN may provide UDM profiles.

The SMS-GMSC of the originating PLMN may send then a request towards the UDM of the originating PLMN to proceed with the procedure to deliver the SMS towards the SMS recipient.

In another case, the subscription PLMN of the SMS recipient is not the originating PLMN. The SMS-GMSC of the originating PLMN may receive the PLMN ID of the subscription PLMN of the SMS recipient, that is not the PLMN ID of the originating PLMN, as a target PLMN ID.

Based on the target PLMN ID, the SMS-GMSC of the originating PLMN may query the NRF of the subscription PLMN of the SMS recipient to discover a UDM of the subscription PLMN of the SMS recipient. In the response, the NRF of the subscription PLMN may provide UDM profiles.

The SMS-GMSC of the originating PLMN may send then a request towards the UDM of the subscription PLMN of the SMS recipient to proceed with the procedure to deliver the SMS towards the SMS recipient.

In step 1 the MNP NF of the originating PLMN (i.e. subscription PLMN of a SMS sender) may register with the NRF of the originating PLMN. The MNP NF profile may comprise a NFType parameter set to 'MNP' and a serviceName parameter set to 'Nmnp_NPStatus'.

In step 2 when the SMS-GMSC of the originating PLMN wants to deliver a SMS from a SMS sender to a SMS recipient, the SMS-GMSC of the originating PLMN may send a request to the NRF of the originating PLMN to discover the MNP NF. The request may comprise a NFtype parameter set to 'MNP' and a serviceName parameter set to 'Nmnp_NPStatus'.

In step 3 the SMS-GMSC of the originating PLMN may receive a response from the NRF of the originating PLMN comprising the MNP NF profile.

In step 4 the SMS-GMSC of the originating PLMN may send a request to the MNP NF of the originating PLMN to retrieve the PLMN ID of the subscription PLMN of the SMS recipient based on the MSISDN ID of the SMS recipient. The request may comprise the MSISDN ID of the SMS recipient In step 5 the MNP NF of the originating PLMN may determine a portability status of the MSISDN ID of the SMS recipient. For example, the MNP NF of the originating PLMN may query a number portability database (NPDB). The portability status of the MSISDN ID of the SMS recipient may be not ported or Portedin or alternatively ported or portedOut.

In step 6 the SMS-GMSC of the originating PLMN may receive a target PLMN ID from the MNP NF of the originating PLMN. Alternatively, the SMS-GMSC of the originating PLMN may receive a URI or a RN from the MNP NF of the originating PLMN to derive the target PLMN ID. The SMS-GMSC of the originating PLMN may determine the portability status of the MSISDN ID of the SMS recipient.

In one case (case 1), the subscription PLMN of the SMS recipient is the originating PLMN. That is, the MSISDN ID of the SMS recipient is not ported or portedln. The SMS-GMSC of the originating PLMN may receive the PLMN ID of the subscription PLMN of the SMS recipient, that is the PLMN ID of the originating PLMN, as a target PLMN ID.

In step 7a the SMS-GMSC of the originating PLMN may send a request to the NRF of the originating PLMN to discover the UDM of the originating PLMN. The request may comprise a NFType parameter set to 'UDM', a serviceName parameter set to 'Nudm_routingInfo' and a PLMN ID parameter set to 'target PLMN ID' received in step 6.

In step 8a the SMS-GMSC of the originating PLMN may receive a response from the NRF of the originating PLMN comprising the UDM profile.

In step 9a the SMS-GMSC of the originating PLMN may send a request to the UDM of the originating PLMN to retrieve user location or routing information for the SMS recipient (e.g. SMSF address) based on the MSISDN ID of the SMS recipient. The request may comprise the MSISDN ID of the SMS recipient and a number portability dip indicator (NPDI).

In step 10a the SMS-GMSC of the originating PLMN may receive a response from the UDM of the originating PLMN comprising user location or routing information for the SMS recipient (e.g. SMSF address).

In another case (case 2), the subscription PLMN of the SMS recipient is not the originating PLMN. That is, the MSISDN ID of the SMS recipient is ported or portedOut. The SMS-GMSC may receive the PLMN ID of the subscription PLMN of the SMS recipient, that is not the PLMN ID of the originating PLMN, as a target PLMN ID.

In step 7b the SMS-GMSC of the originating PLMN may send a request to the NRF of the originating PLMN to discover the UDM of the subscription PLMN of the SMS recipient. The NRF of the originating PLMN may forward the request to the NRF of the subscription PLMN of the SMS recipient. The request may comprise a NFType parameter set to 'UDM', a serviceName parameter set to 'Nudm_routingInfo' and a PLMN ID parameter set to 'target PLMN ID' received in step 6.

In step 8b the NRF of the originating PLMN may receive a response from the NRF of the subscription PLMN of the SMS recipient comprising the UDM profile. The NRF of the originating PLMN may forward the response to the SMS-GMSC of the originating PLMN.

In step 9b the SMS-GMSC of the originating PLMN may send a request to the UDM of the subscription PLMN of the SMS recipient to retrieve user location or routing information for the SMS recipient (e.g. SMSF address) based on the MSISDN ID of the SMS recipient. The request may comprise the MSISDN ID of the SMS recipient and an NPDI.

In step 10b the SMS-GMSC of the originating PLMN may receive a response from the UDM of the subscription PLMN of the SMS recipient comprising user location or routing information for the SMS recipient (e.g. SMSF address).

Figure 5:
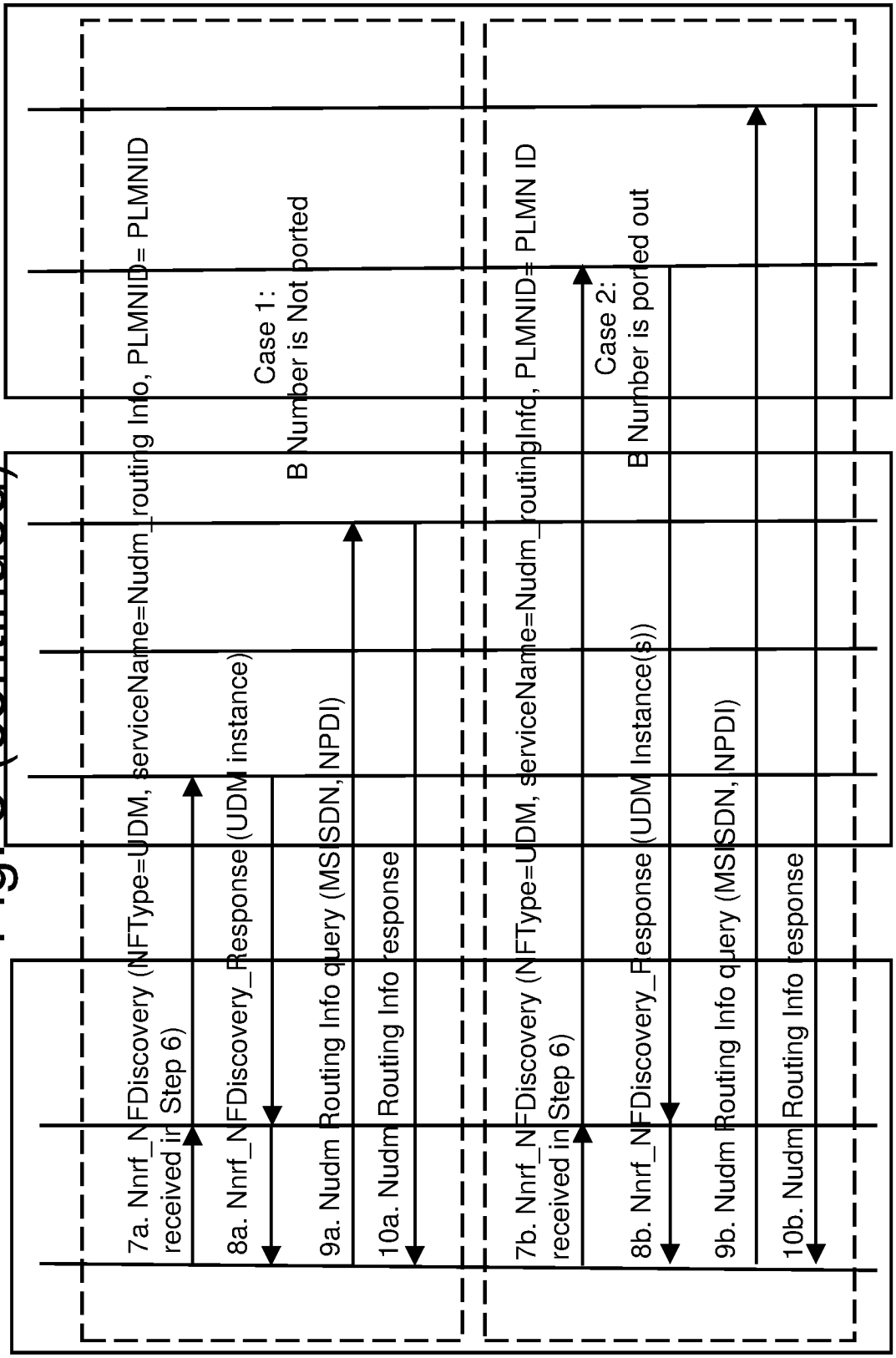
FIG. 5 shows a signaling diagram of another process for retrieving an identifier of a subscription network of a short message service recipient in a communication system according to the first option (indirect routing scenario)

FIG. 5 shows a signaling diagram of another process for retrieving an identifier of a subscription network of an SMS recipient in a communication system according to the first option (indirect routing scenario).

The MNP NF may register with the NRF of the number range holder PLMN. The MNP NF may be discovered via a NRF of the number range holder PLMN. A NFType value "MNP" may be introduced for this purpose.

The MNP NF of the number range holder PLMN may provide a service (e.g. called 'Nmnp_NPStatus') used by a consumer of the originating PLMN to query the PLMN ID of the subscription PLMN of a subscriber based on his/her MSISDN ID. Other formats identifying the target PLM like a uniform resource identifier (URI) or a routing number (RN) may also be possible.

When MSISDN ID or number portability is implemented in a country or in a number portability domain with indirect routing, each network NPDB may only contain information about its own number range MSISDN IDs that are ported or portedOut to another PLMN.

So, the MSISDN ID or number portability query may first be done in the number range holder PLMN. The SMS-GSMC of the originating PLMN may send a request to the NRF of the originating PLMN to discover the MNP NF of the number range holder PLMN. To this end, the target PLMN ID in the request may be the PLMN ID of the number range holder PLMN rather than the PLMN ID of the originating PLMN as in FIG. 4. Then, the NRF of the originating PLMN may route the request to the NRF of the number range holder PLMN.

The indirect routing mechanism is also applicable when the originating network is outside the number portability domain (e.g. International SMS termination).

Once the MNP NF of the number range holder PLMN is discovered, the SMS GSMC of the originating PLMN may proceed as in FIG. 4 (but with querying the MNP NF of the number range holder PLMN).

The NRF of the number range holder PLMN may return an empty NF Discovery Response if no MNP NF can be found matching the query parameters (e.g. the number range holder PLMN has not deployed MNP NFs).

There may be two use cases.

MNP NF is supported in number range holder PLMN but not with SBIs. In this case, the SMS GMSC may send a SRI-SM to number range holder PLMN using a legacy MAP or DIAMETER protocols for the SMS delivery.

MNP NF is not supported in number range holder PLMN and the originating PLMN has a SBI interconnect agreement for SMS with the number range holder PLMN. In this case, the SMS GMSC may use SBI for SMS termination and discover UDM profiles (through NRF).

In step 1 the MNP NF of the number range holder PLMN may register with the NRF of the number range holder PLMN. The MNP NF profile may comprise a NFType parameter set to 'MNP' and a serviceName parameter set to 'Nmnp_NPStatus'

In step 2 when the SMS-GMSC of the originating PLMN wants to deliver a SMS from a SMS sender to a SMS recipient, the SMS-GMSC of the originating PLMN may send a request to the NRF of the originating PLMN to discover the MNP NF of the number range holder PLMN. The NRF of the originating PLMN may forward the request to the NRF of the number range holder PLMN. The request may comprise a NFtype parameter set to 'MNP', a serviceName parameter set to 'Nmnp_NPStatus' and a PLMN ID parameter set to 'PLMN ID of the number range holder'.

In step 3 the NRF of the originating PLMN may receive a response from the NRF of the number range holder PLMN comprising the MNP NF profile. The NRF of the originating PLMN may forward the response to the SMS-GMSC of the originating PLMN.

In step 4 the SMS-GMSC of the originating PLMN may send a request to the MNP NF of the number range holder PLMN to retrieve the PLMN ID of the subscription PLMN of the SMS recipient based on the MSISDN ID of the SMS recipient. The request may comprise the MSISDN ID of the SMS recipient.

In step 5 the MNP NF of the number range holder PLMN may determine a portability status of the MSISDN ID of the SMS recipient. For example, the MNP NF of the number range holder PLMN may query a MSISDN ID portability database or number portability database (NPDB).

In step 6 the SMS-GMSC of the originating PLMN may receive a target PLMN ID from the MNP NF of the number range holder PLMN. Alternatively, the SMS-GMSC of the originating PLMN may receive a URI or a RN from the MNP NF of the number range holder PLMN to derive the target PLMN ID. The portability status of the MSISDN ID of the SMS recipient may be not ported or portedOut.

In one case (case 1), the subscription PLMN of the SMS recipient is the number range holder PLMN. That is, the MSISDN ID of the SMS recipient is not ported. The SMS-GMSC may receive the PLMN ID of the subscription PLMN of the SMS recipient, that is the PLMN ID of the number range holder
PLMN, as a target PLMN ID.

In step 7a the SMS-GMSC of the originating PLMN may send a request to the NRF of the originating PLMN to discover the UDM of the number range holder PLMN. The NRF of the originating PLMN may forward the request to the NRF of the number range holder PLMN. The request may comprise a NFType parameter set to 'UDM', a serviceName parameter set to 'Nudm_routingInfo' and a PLMN ID parameter set to 'target PLMN ID' received in step 6.

In step 8a the NRF of the originating PLMN may receive a response from the NRF of the number range holder PLMN comprising the UDM profile. The NRF of the originating PLMN may forward the response to the SMS-GMSC of the originating PLMN.

In step 9a the SMS-GMSC of the originating PLMN may send a request to the UDM of the number range holder PLMN to retrieve user location or routing information for the SMS recipient (e.g. SMSF address) based on the MSISDN ID of the SMS recipient. The request may comprise the MSISDN ID of the SMS recipient and an NPDI.

In step 10a the SMS-GMSC of the originating PLMN may receive a response from the UDM of the number range holder PLMN comprising user location or routing information for the SMS recipient (e.g. SMSF address).

In another case (case 2), the subscription PLMN of the SMS recipient is not the number range holder PLMN. That is, the MSISDN ID of the SMS recipient is ported or portedOut. The SMS-GMSC may receive the PLMN ID of the subscription PLMN of the SMS recipient, that is not the PLMN ID of the number range holder PLMN, as a target PLMN ID.

In step 7b the SMS-GMSC of the originating PLMN may send a request to the NRF of the originating PLMN to discover the UDM of the subscription PLMN of the SMS recipient. The NRF of the originating PLMN may forward the request to the NFR of the subscription PLMN of the SMS recipient. The request may comprise a NFType parameter set to 'UDM', a serviceName parameter set to 'Nudm_routingInfo' and a PLMN ID parameter set to 'target PLMN ID' received in step 6.

In step 8b the NRF of the originating PLMN may receive a response from the NRF of the subscription PLMN of the SMS recipient comprising the UDM profile. The NRF of the originating PLMN may forward the response to the SMS-GMSC of the originating PLMN.

In step 9b the SMS-GMSC of the originating PLMN may send a request to the UDM of the subscription PLMN of the SMS recipient to retrieve user location or routing information for the SMS recipient (e.g. SMSF address) based on the MSISDN ID of the SMS recipient. The request may comprise the MSISDN ID of the SMS recipient and an NPDI.

In step 10b the SMS-GMSC of the originating PLMN may receive a response from the UDM of the subscription PLMN of the SMS recipient comprising user location or routing information for the SMS recipient (e.g. SMSF address).

Figure 6:
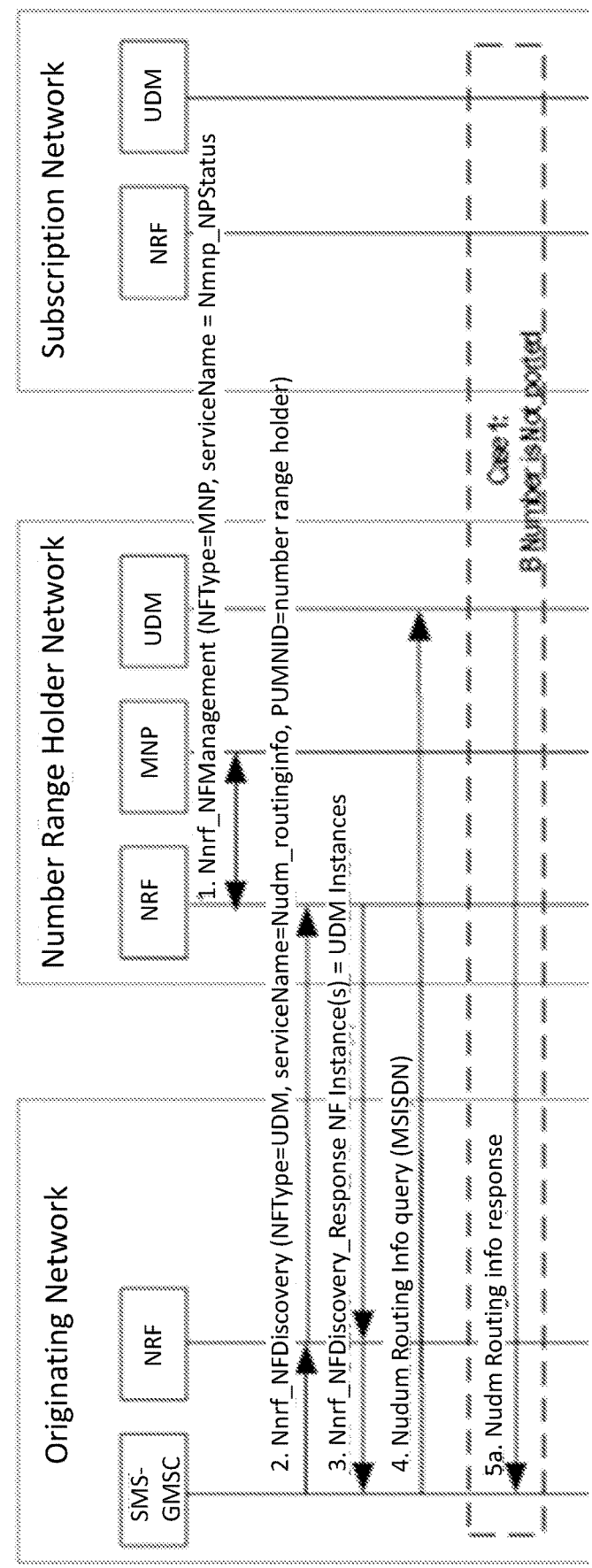
FIG. 6 shows a signaling diagram of a process for retrieving an identifier of a subscription network of a short message service recipient in a communication system according to a second option.
Figure 6:
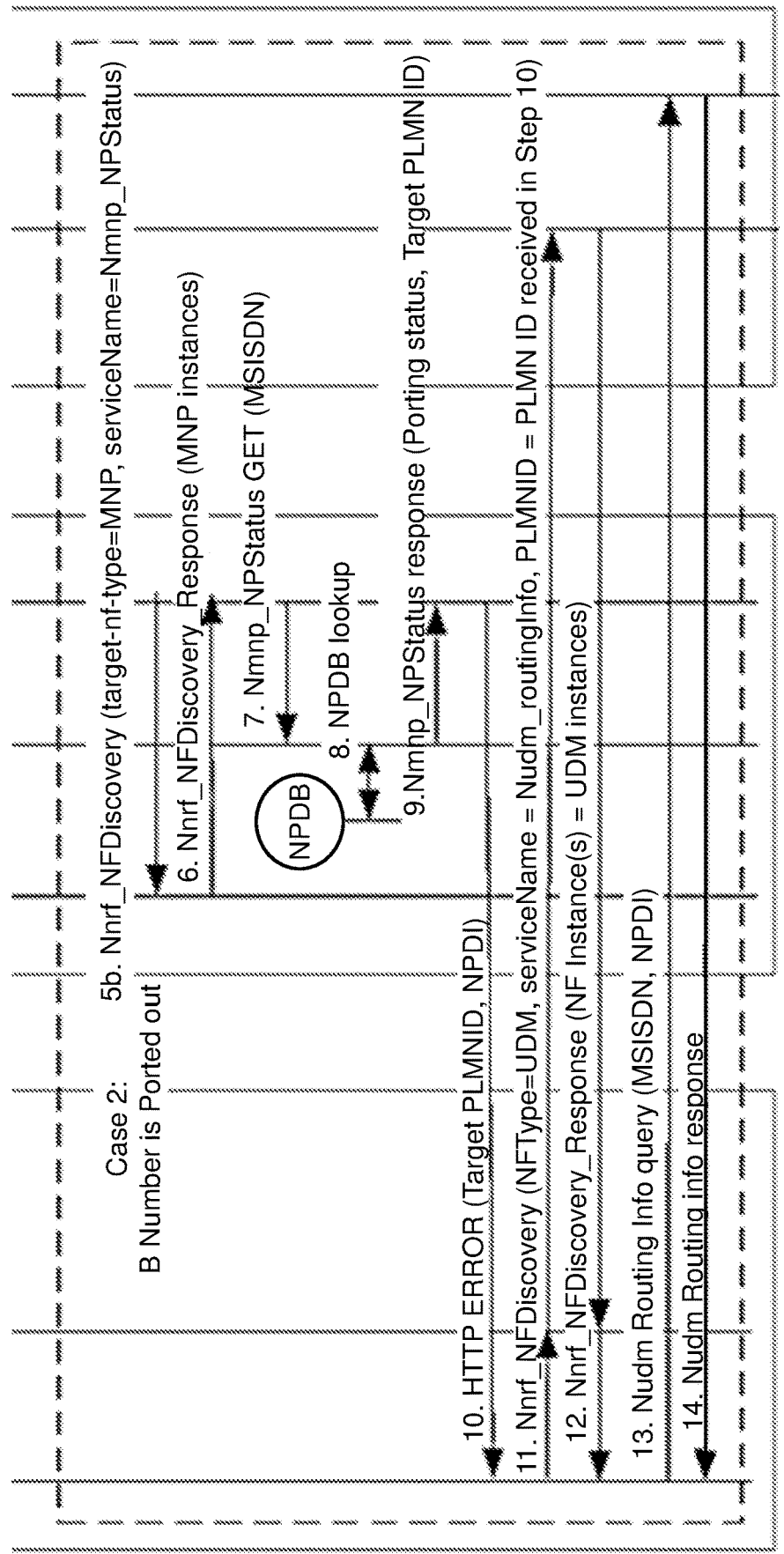

FIG. 6 shows a signaling diagram of a process for retrieving an identifier of a subscription network of an SMS recipient in a communication system according to a second option. In the second option, a UDM (rather than a SMS-GMSC) may discover and query a MNP NF.

The MNP NF may register with the NRF of the number range holder PLMN. The MNP NF may be discovered by a consumer of the number range holder PLMN. A NFType value "MNP" may be introduced for this purpose.

The MNP NF of the number range holder PLMN may provide a service (e.g. called 'Nmnp_NPStatus') used by a consumer of the number range holder PLMN to query the PLMN ID of the subscription PLMN of a subscriber based on his/her MSISDN ID. Other formats identifying the target PLMN like a uniform resource identifier (URI) or a routing number (RN) may also be possible.

When the UDM of the number range holder PLMN receive a request to retrieve user location or routing information for the SMS recipient from the SMS-GMSC of the originating PLMN based on the MSISDN ID of the SMS recipient, if the MSISDN ID of the SMS recipient is not found in a unified data repository (UDR) then the UDM of the number range holder PLMN may determine whether the MSISDN ID of the SMS recipient is portedOut. To do so, the UDM of the number range holder PLMN may send a request to the NRF of the number range holder PLMN to discover the MNP NF of the number range holder PLMN.

To discover the MNP NF of the number range holder PLMN, the UDM of the number range holder PLMN may send the request with the query parameters target-nf-type set to "MNP" along with other query parameters.

If the NRF of the number range holder PLMN returns NF profiles of MNP NF, then the UDM of the number range holder PLMN may contact the MNP NF of the number range holder PLMN via the 'Nmnp_NPStatus' service.

The MNP NF of the number range holder PLMN may return the target PLMN ID of the subscription network of the SMS recipient. Alternatively, the MNP NF of the number range holder PLMN may return a URI or a RN to derive the target PLMN ID of the subscription network of the SMS recipient. Based on the target PLMN ID, the UDM of the number range holder PLMN may reject the request to retrieve user location or routing information for the SMS recipient from the SMS-GMSC of the originating PLMN. That is, the UDM of the number range holder PLMN may not include user location or routing information for the SMS recipient in the response. However, the UDM of the number range holder PLMN may include the target PLMN ID in the response.

When the SMS-GMSC of the originating PLMN receives the response with the target PLMN ID from the UDM of the number range holder PLMN, the SMS-GMSC of the originating PLMN may send a request to the NRF of the subscription PLMN of the SMS recipient to discover the UDM of the subscription PLMN of the SMS recipient. In the response, the NRF of the subscription PLMN of the SMS recipient may provide the NF profiles.

The SMS-GMSC may re-send a request to retrieve user location or routing information for the SMS recipient based on the MSISDN ID of the SMS recipient to the UDM of the subscription PLMN of the SMS recipient.

This option may be useful when the originating network is not aware about number portability implementation in the country where the MSISDN ID or number range belongs and the SMS-GMSC of the originating network may invoke UDM service operation to the number range holder PLMN to fetch the user location or routing information.

In step 1 the MNP NF of the number range holder PLMN may register with the NRF of the number range holder PLMN. The MNP NF profile may comprise a NFType parameter set to 'MNP' and a serviceName parameter set to 'Nmnp_NPStatus'.

In step 2 when the SMS-GMSC of the originating PLMN wants to deliver a SMS from a SMS sender to a SMS recipient, the SMS-GMSC of the originating PLMN may send a request to the NRF of the originating PLMN to discover the UDM of the number range holder PLMN. The NRF of the originating PLMN may forward the request to the NRF of the number range holder PLMN. The request may comprise a NFtype parameter set to 'UDM', a serviceName parameter set to 'Nudm_routingInfo' and a PLMN ID parameter set to 'PLMN ID of the number range holder'.

In step 3 the NRF of the originating PLMN may receive a response from the NRF of the number range holder PLMN comprising the UDM profile. The NRF of the originating PLMN may forward the response to the SMS-GMSC of the originating PLMN.

In step 4 the SMS-GMSC of the originating PLMN may send a request to the UDM of the number range holder PLMN to retrieve user location or routing information for the SMS recipient based on the MSISDN ID of the SMS recipient. The request may comprise the MSISDN ID of the SMS recipient.

In one case (case 1), the subscription PLMN of the SMS recipient is the number range holder PLMN. That is, the MSISDN ID of the SMS recipient is not ported. The UDM may find subscriber data for the MSISDN ID of the SMS recipient in the UDR of the number range holder PLMN.

In step 5a, the SMS-GMSC of the originating PLMN may receive a response comprising user location or routing information for the SMS recipient from the UDM of the number range holder PLMN.

In one case (case 2), the subscription PLMN of the SMS recipient is not the number range holder PLMN. That is, the MSISDN ID of the SMS recipient is ported or ported Out. The UDM may not find subscriber data for the MSISDN ID of the SMS recipient in the UDR of the number range holder PLMN.

In step 5b the UDM of the number range holder PLMN may send a request to the NRF of the number range holder PLMN to discover the MNP NF of the number range holder PLMN. The request may comprise a NFType parameter set to 'MNP' and a serviceName parameter set to 'Nnmp_NP-Status'.

In step 6 the UDM of the number range holder PLMN may receive a response from the NRF of the number range holder PLMN comprising the MNP NF profile.

In step 7 the UDM of the number range holder PLMN may send a request to the MNP NF of the number range holder PLMN to retrieve the PLMN ID of the subscription PLMN of the SMS recipient based on the MSISDN ID of the SMS recipient. The request may comprise the MSISDN ID of the SMS recipient.

In step 8 the MNP NF of the number range holder PLMN may determine a portability status of the MSISDN ID of the SMS recipient. For example, the MNP NF of the number range holder PLMN may query a number portability database (NPDB). The portability status of the MSISDN ID of the SMS recipient may be not ported or portedIn or alternatively ported or portedOut.

In step 9 the UDM of the number range holder PLMN may receive a target PLMN ID from the MNP NF of the number range holder PLMN. Alternatively, the UDM of the number range holder PLMN may receive a URI or a RN from the MNP NF of the number range holder PLMN to derive the target PLMN ID.

In step 10 the UDM of the number range holder PLMN may send a response to the request to retrieve user location or routing information for the SMS recipients received from the SMS-GMSC of the originating PLMN. The response may not include user location or routing information for the SMS recipient. However, the response may include the target PLMN ID.

In step 11 the SMS-GMSC of the originating PLMN may send a request to the NRF of the originating PLMN to discover a UDM of the subscription PLMN of the SMS recipient. The NRF of the originating PLMN may forward the request to the NRF of the subscription PLMN of the SMS recipient. The request may comprise a NFType parameter set to 'UDM', a serviceName parameter set to 'Nudm_routingInfor' and a PLMN ID parameter set to 'target PLMN ID' receive in step 10.

In step 12 the NRF of the originating PLMN may receive a response from the NRF of the subscription PLMN of the SMS recipient comprising a UDM profile for the UDM of the subscription PLMN of the SMS recipient. The NRF of the originating PLMN may forward the response to the SMS-GMSC of the originating PLMN.

In step 13 the SMS-GMSC of the originating PLMN may send a request to the UDM of the subscription PLMN of the SMS recipient to retrieve user location or routing information based on the MSISDN ID of the SMS recipient. The request may comprise the MSISDN ID of the SMS recipient and a NPDI.

In step 14 the SMS-GMSC of the originating PLMN may receive a response from the UDM of the subscription PLMN of the SMS recipient comprising user location or routing information.

Figure 7:
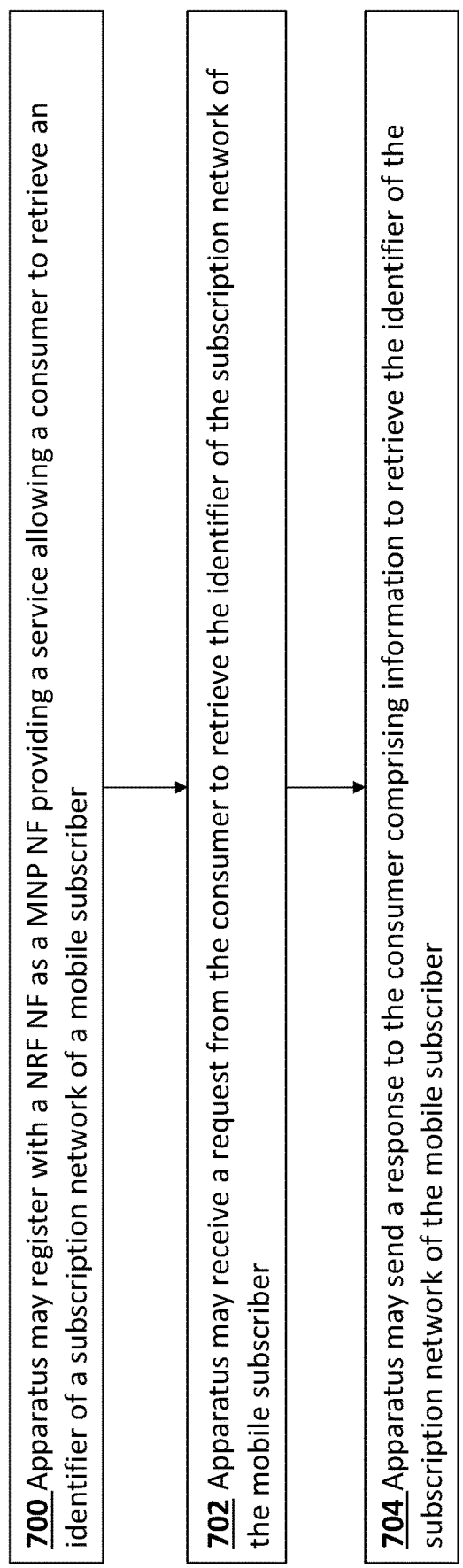
FIG. 7 shows a block diagram of a method for retrieving an identifier of a subscription network of a short message service recipient in a communication system performed, by an apparatus for example, by a mobile number portability.

FIG. 7 shows a block diagram of a method for retrieving an identifier of a subscription network of a short message service recipient in a communication system performed by an apparatus, for example, by a MNP NF.

In step 700 the apparatus may register with a NRF NF as a MNP NF providing a service allowing a consumer to retrieve an identifier of a subscription network of a mobile subscriber.

In step 702, the apparatus may receive a request from the consumer to retrieve the identifier of the subscription network of the mobile subscriber.

In step 704 the apparatus may send a response to the consumer comprising information to retrieve the identifier of the subscription network of the mobile subscriber.

The response may comprise the identifier of the subscription network of the mobile subscriber.

The response may comprise information to derive the identifier of the subscription network of the mobile subscriber.

The identifier of a subscription network may comprise a PLMN ID.

The information to derive the identifier of the subscription network of the mobile subscriber may comprise a RN or a URI.

The mobile subscriber may be a short message service recipient.

The request may comprise an identifier of the mobile subscriber. The identifier of the mobile subscriber may comprise a MSISDN ID.

The apparatus may determine a portability status of the identifier of the mobile subscriber.

The apparatus may determine that the identifier of the mobile subscriber is not ported. The identifier of the subscription network of the mobile subscriber may comprise an identifier of a network the apparatus belongs to.

The apparatus may determine that the identifier of the mobile subscriber is ported. The identifier of the subscription network of the mobile subscriber may comprise an identifier of a network the apparatus does not belong to.

The consumer may be a SMS-MSC or a UDM NF.

Figure 8:
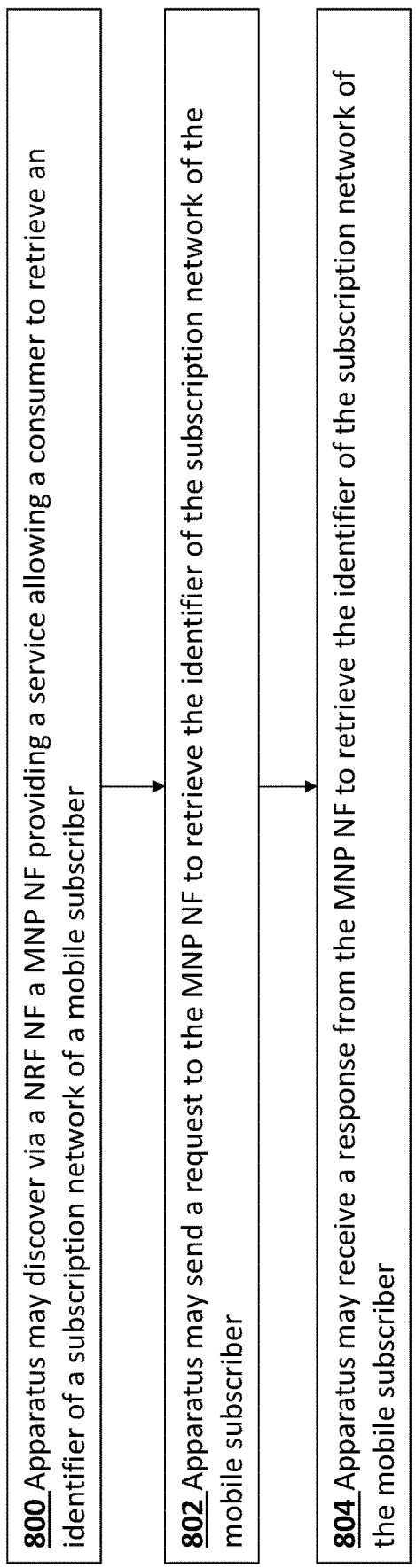
FIG. 8 shows a block diagram of a method for retrieving an identifier of a subscription network of a short message service recipient in a communication system performed, by an apparatus for example, by a short message service gateway mobile service switching center or a unified data management.

FIG. 8 shows a block diagram of a method for retrieving an identifier of a subscription network of a SMS recipient in a communication system performed by an apparatus, for example, by a SMS-GMSC or a UDM.

In step 800 the apparatus may discover via a NRF NF a MNP NF providing a service allowing a consumer to retrieve an identifier of a subscription network of a mobile subscriber.

In step 802 the apparatus may send a request to the MNP NF to retrieve the identifier of the subscription network of the mobile subscriber.

In step 804 the apparatus may receive a response from the MNP NF to retrieve the identifier of the subscription network of the mobile subscriber.

The response may comprise the identifier of the subscription network of the mobile subscriber.

The response may comprise information to derive the identifier of the subscription network of the mobile subscriber.

The identifier of a subscription network may comprise a PLMN identifier.

The information to derive the identifier of the subscription network of the mobile subscriber may comprise a RN or a URI.

The request may comprise an identifier of the mobile subscriber. The identifier of the mobile subscriber may comprise a MSISDN ID.

The identifier of the subscription network of the mobile subscriber may comprise an identifier of a network the apparatus belongs to.

The identifier of the subscription network of the mobile subscriber may comprise an identifier of a network the apparatus does not belong to.

The apparatus may be a SMS-GMSC.

The apparatus may use an identifier of a network owning an identifier of the mobile subscriber to discover via a NRF NF a UDM NF. The apparatus may send a request to the UDM NF to retrieve routing information for the mobile subscriber.

The apparatus may use the received identifier of the subscription network of the mobile subscriber to discover via a NRF NF a UDM NF.

The NRF NF and the UDM NF may belong to the same network than the apparatus.

The NRF NF and the UDM NF may not belong to the same network than the apparatus and belong to a network owning the identifier of the mobile subscriber.

The NRF NF and the UDM NF may not belong to the same network than the apparatus and may not belong to a network owning the identifier of the mobile subscriber.

The apparatus may send a request to the UDM NF to retrieve routing information for the mobile subscriber.

Alternatively, the apparatus may be a unified data management network function.

The apparatus may receive a request from a SMS-GMSC to retrieve routing information for the mobile subscriber. The apparatus may determine that subscriber data of the mobile subscriber is not stored in a UDR. The apparatus may send a response to the SMS-GMSC without routing information for the mobile subscriber and with the identifier of the subscription network of the mobile subscriber.

FIG. 9 shows a schematic representation of non-volatile memory media 900a (e.g. computer disc (CD) or digital versatile disc (DVD)) and 900b (e.g. universal serial bus (USB) memory stick) storing instructions and/or parameters 902 which when executed by a processor allow the processor to perform one or more of the steps of the methods of FIGS. 7 and 8.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

It will also be understood that although the description refers to entities, such as SMS-GMSC, entities with a different name but performing similar functions, for example short message service center (SMSC), may alternatively be used.

The embodiments may thus vary within the scope of the claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 7 and 8, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:

(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the claims However, all such and similar modifications of the teachings will still fall within the scope as defined in the claims.

The invention claimed is:

1. An apparatus comprising:
a processor; and
a memory comprising computer-executable instructions that, when executed by the processor, cause a mobile number portability network function the apparatus to perform the following operations:
register with a 5G system network repository function network function as a mobile number portability network function providing a service allowing a consumer to retrieve an identifier of a subscription network of a mobile subscriber;
receive, by the mobile number portability network function, a request from the consumer to retrieve the identifier of the subscription network of the mobile subscriber;
determine, by the mobile number portability network function, a portability status of an identifier of the mobile subscriber;
based on the portability status of the identifier of the mobile subscriber. determine, by the mobile number portability network function, the identifier of the subscription network of the mobile subscriber; and
send a response to the consumer, wherein the response comprises the identifier of the subscription network of the mobile subscriber.

2. The apparatus of claim 1 wherein the identifier of the subscription network comprises a public land mobile network identifier.

3. The apparatus of claim 1, wherein the mobile subscriber is a short message service recipient.

4. The apparatus of claim 1, wherein the computer-executable instructions further cause the apparatus to determine that the identifier of the mobile subscriber is ported, wherein the identifier of the subscription network of the mobile subscriber comprises an identifier of a network the apparatus does not belong to.

5. The apparatus of any of claim 1, wherein the consumer is a short message service gateway mobile services switching center or a unified data management network function.

6. An apparatus comprising:
at least one processor; and
at least one memory including computer code for one or more programs, the at least one memory and the computer code configured, with the at least one processor, to cause the apparatus at least to:
discover via a network repository function network function a mobile number portability network function providing a service allowing a consumer to retrieve an identifier of a subscription network of a mobile subscriber;
send a request to the mobile number portability network function to retrieve the identifier of the subscription network of the mobile subscriber; and
receive a response from the mobile number portability network function, wherein the response comprises the identifier of the subscription network of the mobile subscriber, wherein the identifier of the subscription network is based on a portability status of an identifier of the mobile subscriber.

7. The apparatus of claim 6, wherein the identifier of a subscription network comprises a public land mobile network identifier.

8. The apparatus of claim 6, wherein the request comprises an identifier of the mobile subscriber, and wherein the identifier of the mobile subscriber comprises a mobile subscriber integrated services digital network identifier.

9. The apparatus of claim 6, wherein the apparatus is a short message service gateway mobile services switching center.

10. The apparatus of claim 9, wherein the at least one memory and the computer code are configured, with the at least one processor, to cause the apparatus at least to:
use an identifier of a network owning an identifier of the mobile subscriber to discover, via a network repository function network function, a unified data management network function; and
send a request to the unified data management network function to retrieve routing information for the mobile subscriber.

11. The apparatus of claim 9, wherein the at least one memory and the computer code are configured, with the at least one processor, to cause the apparatus at least to:
use the identifier of the subscription network of the mobile subscriber to discover, via a network repository function network function, a unified data management network function; and
send a request to the unified data management network function to retrieve routing information for the mobile subscriber.

12. The apparatus of claim 11, wherein the network repository function network function and the unified data management network function belong to a same network of the apparatus;
wherein the network repository function network function and the unified data management network function do not belong to the same network of the apparatus and belong to a network owning the identifier of the mobile subscriber; or
wherein the network repository function network function and the unified data management network function do not belong to the same network of the apparatus and do not belong to a network owning the identifier of the mobile subscriber.

13. The apparatus of claim 6, wherein the apparatus is a unified data management network function.

14. The apparatus of claim 13,
wherein the at least one memory and the computer code are configured, with the at least one processor, to cause the apparatus at least to:
receive a request from a short message service gateway mobile services switching center to retrieve routing information for the mobile subscriber;
determine that subscriber data of the mobile subscriber is not stored in a unified data repository; and
send a response to the short message service gateway mobile services switching center without routing information for the mobile subscriber and with the identifier of the subscription network of the mobile subscriber.

15. A method comprising:
registering with a network repository function network function as a mobile number portability network function providing a service allowing a consumer to retrieve an identifier of a subscription network of a mobile subscriber;
receiving, by the mobile number portability network function, a request from the consumer to retrieve the identifier of the subscription network of the mobile subscriber;
determining, by the mobile number portability network function, a portability status of an identifier of the mobile subscriber;
based on the portability status of the identifier of the mobile subscriber, determining, by the mobile number portability network function, the identifier of the subscription network of the mobile subscriber; and
sending a response to the consumer, wherein the response comprises the identifier of the subscription network of the mobile subscriber.

16. The method of claim 15, further comprising:
based on the identifier of the subscription network of the mobile subscriber, sending a request to a unified data management of the subscription network for routing information for the mobile subscriber; and
receiving, from the unified data management of the subscription network, the routing information for the mobile subscriber.

17. The method of claim 15, wherein the identifier of the subscription network comprises a public land mobile network identifier.

18. The method of claim 15, wherein the mobile subscriber is a short message service recipient.

* * * * *